US008483146B2

(12) United States Patent
Chun et al.

(10) Patent No.: US 8,483,146 B2
(45) Date of Patent: Jul. 9, 2013

(54) METHOD FOR PERFORMING EFFICIENT BSR PROCEDURE USING SPS RESOURCE

(75) Inventors: Sung-Duck Chun, Gyeonggi-Do (KR);
Seung-June Yi, Gyeonggi-Do (KR);
Sung-Jun Park, Gyeonggi-Do (KR);
Young-Dae Lee, Gyeonggi-Do (KR)

(73) Assignee: LG Electronics Inc., Seoul (KR)

(*) Notice: Subject to any disclaimer, the term of this patent is extended or adjusted under 35 U.S.C. 154(b) by 854 days.

(21) Appl. No.: 12/362,819

(22) Filed: Jan. 30, 2009

(65) Prior Publication Data

US 2009/0197610 A1     Aug. 6, 2009

Related U.S. Application Data

(60) Provisional application No. 61/025,311, filed on Feb. 1, 2008, provisional application No. 61/026,119, filed on Feb. 4, 2008, provisional application No. 61/037,309, filed on Mar. 17, 2008.

(30) Foreign Application Priority Data

Jan. 29, 2009   (KR) .................. 10-2009-0007143

(51) Int. Cl.
*H04W 4/00*   (2009.01)

(52) U.S. Cl.
USPC ............ 370/329; 370/328; 455/438; 455/450

(58) Field of Classification Search
USPC ......................................................... 370/472
See application file for complete search history.

(56) References Cited

U.S. PATENT DOCUMENTS

| 8,243,660 | B2 * | 8/2012 | Jeong et al. .................... | 370/329 |
| 2001/0031638 | A1 | 10/2001 | Korpela et al. | |
| 2006/0062237 | A1 | 3/2006 | Kim | |
| 2007/0189205 | A1 * | 8/2007 | Terry et al. .................... | 370/328 |
| 2008/0137573 | A1 * | 6/2008 | Cave et al. .................... | 370/310 |
| 2010/0279695 | A1 * | 11/2010 | Amirijoo et al. ............. | 455/438 |

FOREIGN PATENT DOCUMENTS

| EP | 1286564 A1 | 2/2003 |
| EP | 1771024 A1 | 4/2007 |

OTHER PUBLICATIONS

3GPP: "3rd Generation Partnership Project; Technical Specification Group Radio Access Network; User Equipment (UE) procedures in idle mode and procedures for cell reselection in connected mode (Release 8)," 3GPP TS 25.304 V8.0.0, [Online] Dec. 2007, pp. 1-41, XP002524363, Retrieved from the Internet: URL:http://www.3gpp.org/ftp/Specs/archive/25_series/25.304/> [retrieved on Apr. 20, 2009].

LG Electronics Inc: "Correction to HCS," Discussion, Decision, 3GPP TSG-RAN WG2 #61bis, Mar.31-Apr. 4, 2008, Shenzhen, China, 6.2, R2-081566, pp. 1-18.

* cited by examiner

*Primary Examiner* — Ian N Moore
*Assistant Examiner* — Brian T Le
(74) *Attorney, Agent, or Firm* — Birch, Stewart, Kolasch & Birch, LLP

(57) ABSTRACT

The present invention relates to a wireless communication system and a terminal providing a wireless communication service and to a method by which a base station and a terminal transmit and receive data in an evolved universal mobile telecommunications system (E-UMTS) evolved from universal mobile telecommunications system (UMTS) or a long term evolution (LTE) system, and more particularly, to a method whereby, in requesting allocation of radio resources by a user equipment (UE), which has been allocated continuous allocation radio resources, from a base station, the UE compares an allocation time point of continuous allocation radio resources and a start time point of a radio resource request procedure and effectively transmit a radio resource allocation request.

20 Claims, 6 Drawing Sheets

METHOD FOR PERFORMING EFFICIENT BSR PROCEDURE USING SPS RESOURCE

This Non-provisional application claims priority under 35 U.S.C. §119(e) on U.S. Provisional Application Nos. 61/025, 311, 61/026,119, and 61/037,309 filed on Feb. 1, 2008, Feb. 4, 2008 and Mar. 17, 2008, respectively, and under 35 U.S.C. §119(a) on Patent Application No. 10-2009-0007143 filed in the Republic of Korea of on Jan. 29, 2009. The entire contents of all of the above applications are hereby incorporated by reference into the present application.

TECHNICAL FIELD

The present invention relates to a wireless communication system and a terminal providing a wireless communication service and to a method by which a base station and a terminal transmit and receive data in an evolved universal mobile telecommunications system (E-UMTS) evolved from universal mobile telecommunications system (UMTS) or a long term evolution (LTE) system, and more particularly, to a method whereby, in requesting allocation of radio resources by a user equipment (UE), which has been allocated continuous allocation radio resources, from a base station, the UE compares an allocation time point of continuous allocation radio resources and a start time point of a radio resource request procedure and effectively transmit a radio resource allocation request.

BACKGROUND ART

Figure 1:
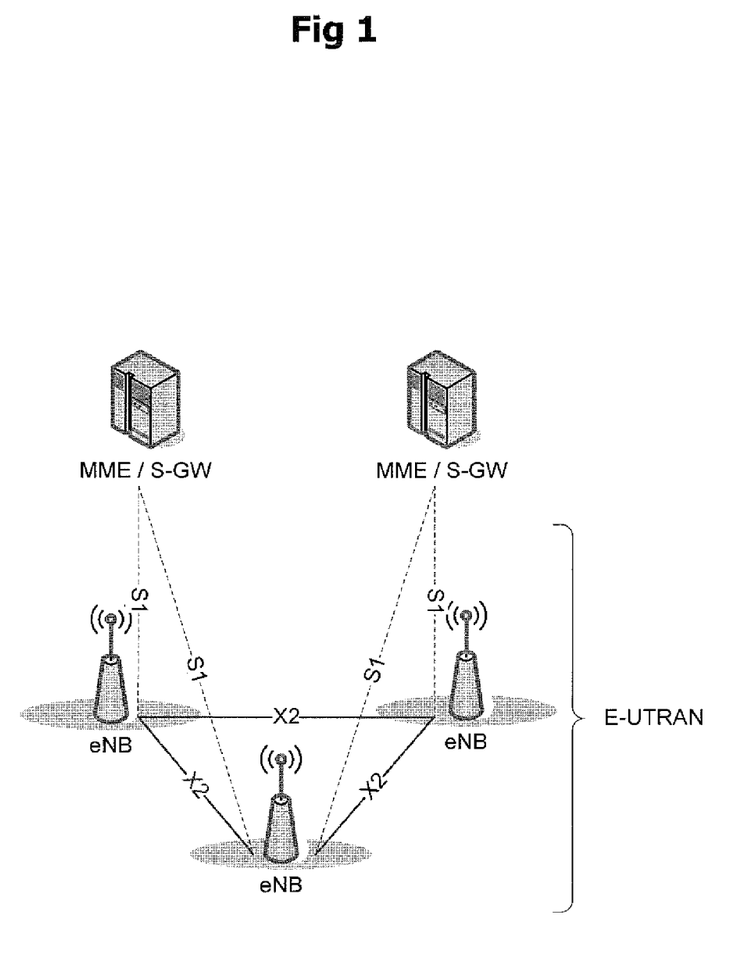
FIG. 1 shows a network structure of an E-UMTS, a mobile communication system, applicable to the related art and the present invention.

FIG. 1 shows a network structure of the E-UMTS, a mobile communication system, applicable to the related art and the present invention. The E-UMTS system has been evolved from the UMTS system, for which the 3GPP is proceeding with the preparation of the basic specifications. The E-UMTS system may be classified as the LTE (Long Term Evolution) system.

The E-UMTS network may be divided into an evolved-UMTS terrestrial radio access network (E-UTRAN) and a core network (CN). The E-UTRAN includes a terminal (referred to as 'UE (User Equipment), hereinafter), a base station (referred to as an eNode B, hereinafter), a serving gateway (S-GW) located at a termination of a network and connected to an external network, and a mobility management entity (MME) superintending mobility of the UE. One or more cells may exist for a single eNode B.

Figure 2:
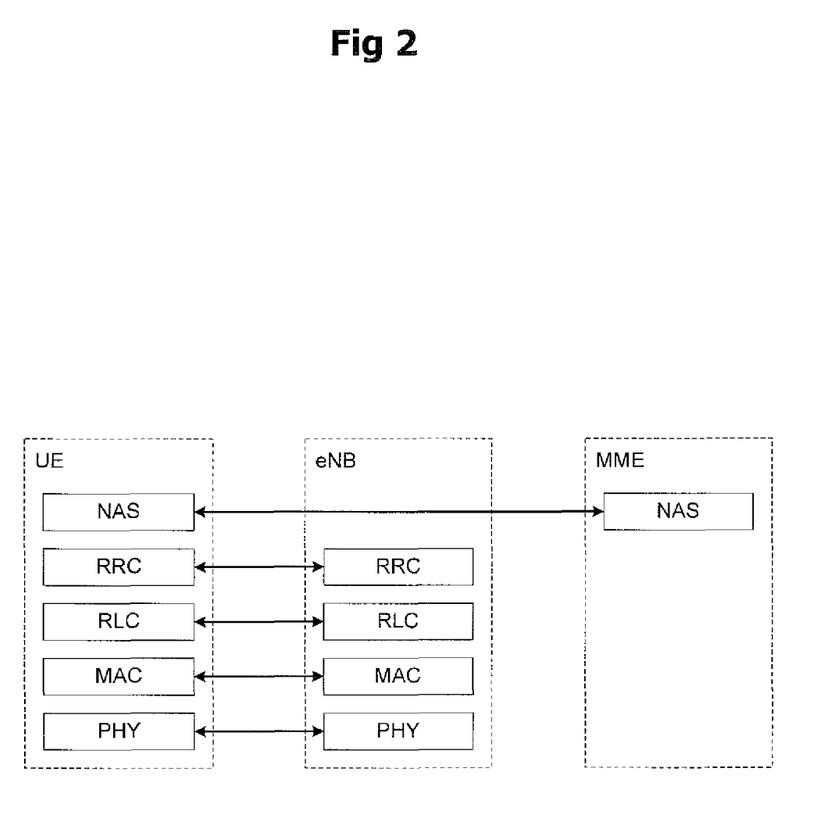
FIG. 2 shows an exemplary structure of a control plane of a radio interface protocol between a UE and a UTRAN (UMTS Terrestrial Radio Access Network) based on 3GPP radio access network standards according to the related art.
Figure 3:
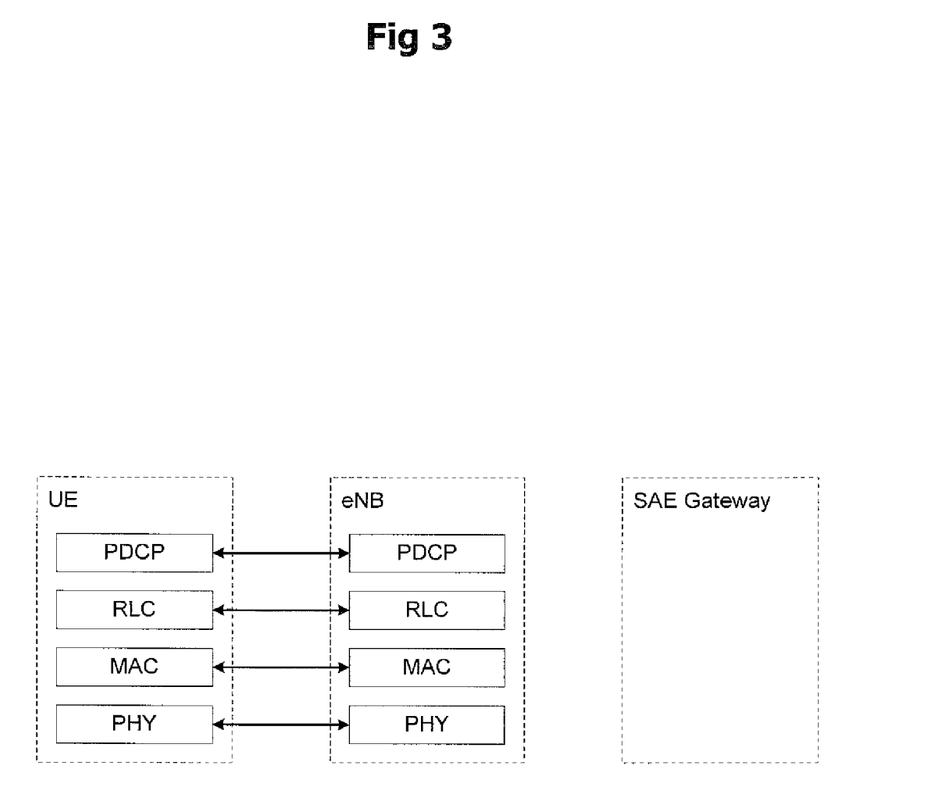
FIG. 3 shows an exemplary structure of a user plane of the radio interface protocol between the UE and the UTRAN based on 3GPP radio access network standards according to the related art.

FIGS. 2 and 3 illustrate a radio interface protocol architecture based on a 3GPP radio access network specification between the UE and the base station. The radio interface protocol has horizontal layers comprising a physical layer, a data link layer, and a network layer, and has vertical planes comprising a user plane for transmitting data information and a control plane for transmitting control signals (signaling). The protocol layers can be divided into the first layer (L1), the second layer (L2), and the third layer (L3) based on three lower layers of an open system interconnection (OSI) standard model widely known in communication systems.

The radio protocol control plane in FIG. 2 and each layer of the radio protocol user plane in FIG. 3 will now be described.

The physical layer, namely, the first layer (L1), provides an information transfer service to an upper layer by using a physical channel. The physical layer is connected to an upper layer called a medium access control (MAC) layer via a transport channel, and data is transferred between the MAC layer and the physical layer via the transport channel. Meanwhile, between different physical layers, namely, between a physical layer of a transmitting side and that of a receiving side, data is transferred via a physical channel.

The MAC layer of the second layer provides a service to a radio link control (RLC) layer, its upper layer, via a logical channel. An RLC layer of the second layer may support reliable data transmissions. A PDCP layer of the second layer performs a header compression function to reduce the size of a header of an IP packet including sizable unnecessary control information, to thereby effectively transmit an IP packet such as IPv4 or IPv6 in a radio interface with a relatively small bandwidth.

A radio resource control (RRC) layer located at the lowest portion of the third layer is defined only in the control plane and handles the controlling of logical channels, transport channels and physical channels in relation to configuration, reconfiguration and release of radio bearers (RBs). The radio bearer refers to a service provided by the second layer (L2) for data transmission between the UE and the UTRAN.

A random access channel (RACH) will now be described. The RACH is used to transmit data with a relatively short length to uplink, and in particular, the RACH is used when a UE, which has not been allocated dedicated radio resources, has a signaling message or user data to be transmitted to uplink. Or, the RACH may be also used for a base station to instruct a UE to perform a RACH procedure.

A random access channel (RACH) procedure provided by the LTE system will now be described. The RACH procedure provided by the LTE system is divided into a contention-based RACH procedure and a non-contention-based RACH procedure. The contention-based RACH procedure and the non-contention-based RACH procedure are determined based on whether or not a random access preamble used in a RACH procedure has been directly selected by a UE or by a base station.

In the non-contention-based RACH procedure, the UE uses a random access preamble the base station has directly allocated to the UE. Thus, when the base station allocates the particular random access preamble only to the UE, the random access preamble is used by only the UE while other UEs do not use it. Thus, a one-to-one relationship is established between the random access preamble and the UE using the random access preamble, so there is no collision. This is effective because the base station can recognize the UE that has transmitted the random access preamble upon receiving the random access preamble.

Meanwhile, in the contention-based RACH procedure, the base station selectively transmits one of random access preambles, so there is a possibility that a plurality of UEs may use the same random access preamble. Thus, when the base station receives a certain particular random access preamble, it cannot recognize which UE has transmitted the random access preamble.

In general, the UE may perform the RACH procedure in the following cases: 1) hen the UE performs initial accessing because it is not RRC-connected with the base station, 2) when the UE is first connected to a target cell during a handover process, 3) when the RACH procedure is requested by an instruction of the base station, 4) when data to uplink is generated in a state that time synchronization of uplink is not matched or in a state that designated radio resources used for requesting radio resources have not been allocated, and 5) when a recovery process is performed in case of a radio link failure or a handover failure.

Figure 4:
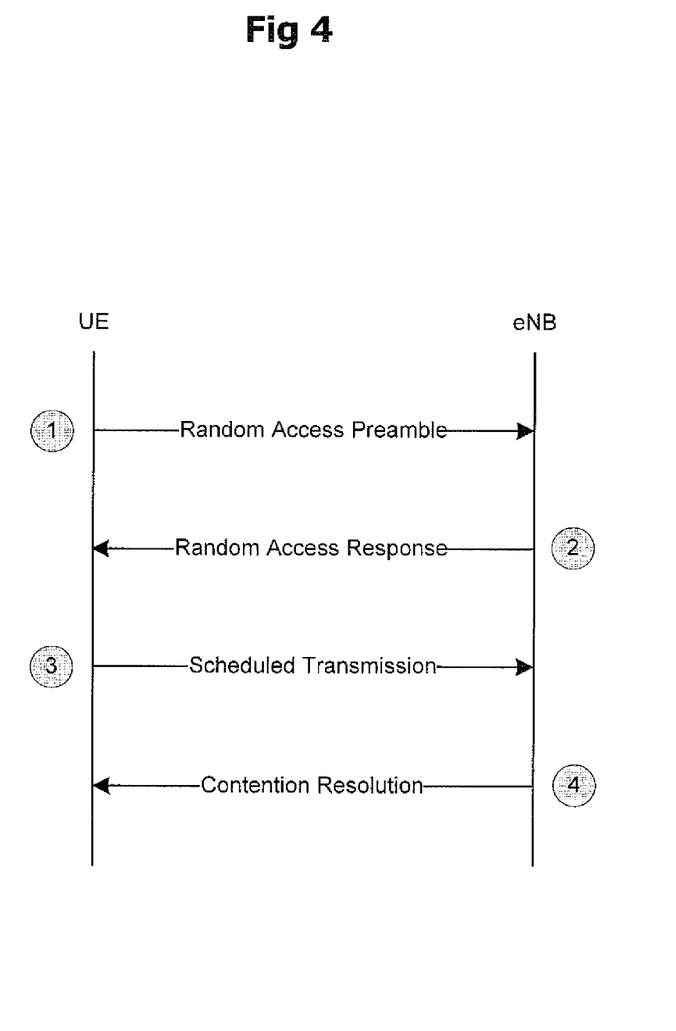
FIG. 4 illustrates a contention-based RACH procedure.

FIG. 4 shows operations of the UE and the base station in the contention-based RACH procedure.

First, in the contention-based random access, the UE randomly selects one random access preamble from a set of random access preambles instructed by system information or a handover command, selects PRACH resource that can transmit the random access preamble, and transmits the same (first step). The preamble at this time is called an RACH MSG 1.

After transmitting the random access preamble, the UE attempts receiving of a response to its random access preamble within a random access response reception window instructed by the system information or the handover command (second step). In more detail, random access response information is transmitted in the form of MAC PDU, and the MAC PDU may be transferred via a physical downlink shared channel (PDSCH). In addition, in order for the UE to properly receive information transmitted via the PDSCH, a physical downlink control channel (PDCCH) is also transferred. Namely, the PDCCH may include information about the UE which is to receive the PDSCH, frequency and time information of radio resources of the PDSCH, a transmission format of the PDSCH, and the like. Here, when the UE successfully receives the PDCCH which has been transmitted thereto, it properly receives the random access response transmitted via the PDSCH according to the information of the PDSCH. The random access response includes a random access preamble identifier (ID), a UL grant (uplink radio resources), a temporary C-RNTI (temporary cell identifier), and a time alignment command (time synchronization correction value). The reason why the random access preamble ID is required is because one random access response may include random access response information for one or more UEs, so the random access preamble ID informs about for which UE the UL grant, the temporary C-RNTI and the time alignment command information are valid. The random access preamble ID is identical to the random access preamble that has been selected by the UE itself.

Here, when the UE receives the random access response valid for the UE itself, the UE processes information included in the random access response. Namely, the UE applies the time alignment command and stores the temporary C-RNTI. In addition, the UE transmits data stored in its buffer or newly generated data to the base station (third step). In this case, data (referred to as 'MSG 3', hereinafter) included in the UL grant should necessarily include an identifier of the UE. The reason is because, in the contention-based RACH procedure, the base station can hardly determine which UEs perform the RACH procedure, and it should identify UEs to prevent occurrence of collision. Here, there are two methods for including the ID of the UE. The first method is that when the UE already has a valid cell ID which has been allocated in a corresponding cell before the RACH procedure, the UE transmits its cell ID via the UL grant. If, however, the UE has not been allocated a valid cell ID before the RACH procedure, the UE includes its unique ID (e.g., an S-TMSI or a random ID) and transmits the same. In general, the unique ID is longer than the cell ID. In the third step, when the UE transmits data via the UL grant, the UE starts a contention resolution timer.

After the UE transmits the data including its ID via the UL grant included in the random access response, the UE waits for an instruction of the base station to resolve contention. Namely, the UE attempts receiving of the PDCCH to receive a particular message (a fourth step). Here, there are two methods for receiving the PDCCH. As mentioned above, if the identifier of the UE transmitted via the UL grant is a cell ID of the UE, the UE attempts receiving of the PDCCH by using its cell ID, and if the identifier is its unique ID, the UE attempts receiving of the PDCCH by using the temporary C-RNTI included in the random access response. Thereafter, in the former case, if the UE receives the PDCCH (referred to as 'MSG 4', hereinafter) via its cell ID before the contention resolution timer expires, the UE determines that the RACH procedure has been normally performed, and terminates the RACH procedure. In the latter case, if the PDCCH is received via the temporary cell ID before the contention resolution timer expires, the UE checks data (referred to as 'MSG 4', hereinafter) transferred by the PDSCH indicated by the PDCCH. If content of the data includes its unique ID, the UE determines that the RACH procedure has been normally performed and terminates the RACH procedure. Here, the message or the MAC PDU received in the fourth step is usually called RACH MSG 4.

Figure 5:
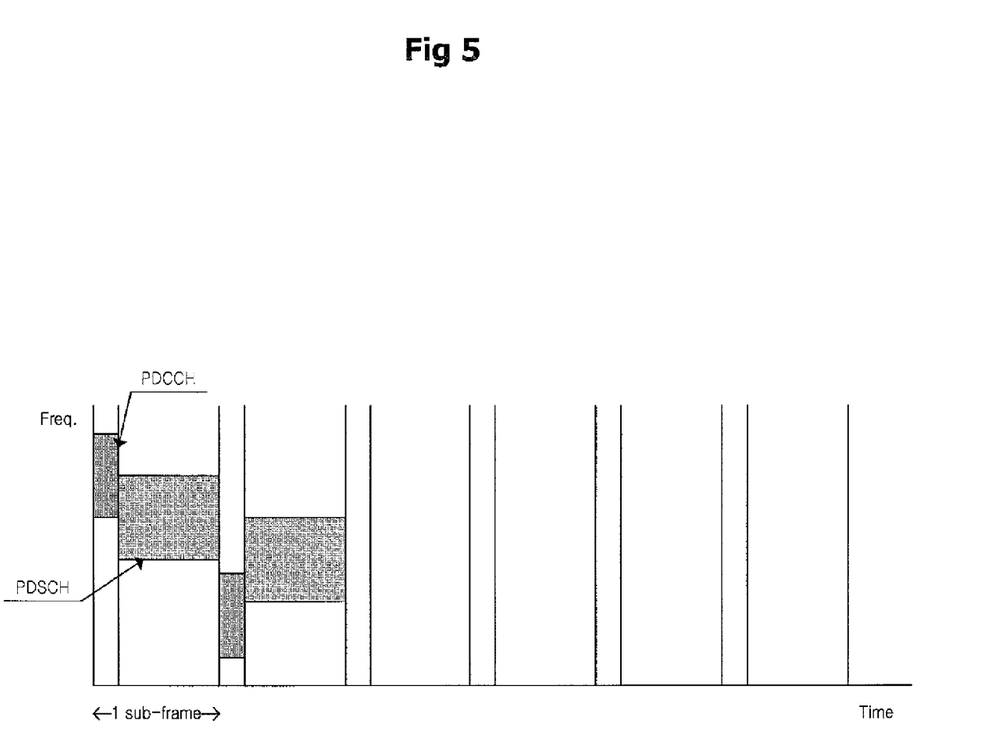
FIG. 5 illustrates allocation of radio resources according to the related art.

A method for receiving downlink data by the UE in the LTE system will now be described. FIG. 5 illustrates allocation or radio resources according to the related art.

In the downlink direction, physical channels are divided into the physical downlink control channel (PDCCH) and the physical downlink shared channel (PDSCH). The PDCCH is not directly related to transmission of user data and transmits control information required for operating a physical channel. Briefly, the PDCCH may be used to control other physical channels. In particular, the PDCCH is used to transmit information required for receiving the PDSCH. Information such as for which UE data is designated to be transmitted by using a particular frequency band at a particular point, which size of data is transmitted, and the like, is transmitted via the PDCCH. Thus, each UE receives the PDCCH at a particular TTI and checks whether or not data to be received by the UE is transmitted via the PDCCH. If it is informed that data to be received by the UE is transmitted, the UE additionally receives the PDSCH by using information such as frequency indicated by the PDCCH. Information about to which UE (one or a plurality of UEs) data of the PDSCH is transmitted or how the UEs receive the PDSCH data and decode it, and the like, may be included in a physical PDCCH and transmitted.

For example, it is assumed that, in a particular sub-frame, radio resource information (e.g., a frequency position) called 'A' and transmission format information (e.g., transport block size, modulation and coding information, etc.) called 'B' are CRC-masked to an RNTI (Radio Network Temporary Identity) called 'C', and transmitted via the PDCCH. One or two or more UEs located in a corresponding cell monitor the PDCCH by using their RNTI information, and on the above assumption, when the UE having the RNTI called 'C' decodes the PDCCH, a CRC error does not occur. Thus, the UE decodes the PDSCH to receive the data by using the transmission format information called 'B' and the radio resource information called 'A'. Meanwhile, on the above assumption, if the UE does not have the RNTI called 'C', when the PDCCH is decoded, a CRC error occurs. Thus, the UE does not receive the PDSCH.

In the above procedure, the RNTI (Radio Network Temporary Identifier) is transmitted to inform to which UEs radio resources have been allocated. The RNTI includes a dedicated RNTI and a common RNTI. The dedicated RNTI is allocated to a single UE and used to transmit/receive data corresponding to the UE. The dedicated RNTI is allocated only to a UE whose information has been registered in the base station. Meanwhile, the common RNTI is used when UEs, which have not been allocated the dedicated RNTI because their information was not registered to the base station, transmit or receive data to or from the base station, or the common RNTI is used to transmit information commonly applied for a plurality of UEs.

As mentioned above, the base station and the UE are two main entities constituting the E-UTRAN. Radio resources in a single cell include uplink radio resources and downlink resources. The base station handles allocating and controlling of uplink and downlink radio resources and downlink radio resources of the cell. Namely, the base station determines which UE uses which radio resources at which moment. For example, the base station may determine to allocate frequency from 100 Mhz to 101 Mhz to a user 1 for downlink data transmission in 3.2 seconds. After such determination, the base station informs the UE accordingly so that the UE can receive downlink data. Also, the base station may determine when and which UE is allowed to transmit uplink data by using which and how many radio resources, and then informs a corresponding UE accordingly, so that the UE can transmit data by using the radio resources for the corresponding time. In the related art, a single terminal keeps using a single radio resource during a call connection, which is irrational for the recent services which are mostly based on IP packets. That is, in most packet services, packets are not continually generated during a call connection but there are intervals in the call during which none is transmitted. Thus, continuously allocating radio resources to the single terminal is ineffective. To solve this problem, the E-UTRAN system employs a method in which radio resources are allocated to the UE in the above-described manner only when the UE requires it or only when there is service data.

A semi-persistent scheduling (or a semi-persistent radio resource allocation method) or semi-permanent scheduling (or a semi-permanent radio resource allocation method) will now be described. In general, the UE transmits data to the base station through the process including: 1) the UE requests radio resources required for transmitting generated data from the base station, 2) the base station allocates radio resources through a control signal according to the UE request for radio resources, and 3) the UE transmits the data to the base station through the allocated radio resources. However, in the VoIP service, in general, small packets of uniform size are frequently and regularly transmitted. So, the effective radio resource allocation scheme can be applied in consideration of such characteristics. Namely, the semi-permanent scheduling is also one of radio resource allocation schemes optimized for a VoIP service. In this method, transmission of information regarding allocation of radio resources is omitted. In more detail, when VoIP starts, A packet size and period of RTP are previously determined and radio resources are permanently allocated. Accordingly, the UE may immediately perform the process of transmitting data without the first and second steps, namely, without the radio resource requesting step and the radio resource allocation step, as mentioned above, according to such setting of resource resources. That is, in the semi-persistent scheduling, there is no need to transmit radio resource allocation information via a PDCCH. Without receiving the PDCCH each time, the UE can periodically receive particular radio resources or transmit data by using particular radio resources according to pre-set information. Meanwhile, the dynamic scheduling is a method for informing about radio resources to be received or to be transmitted by the UE each time.

The base station may selectively set a dedicated scheduling request channel (D-SR Channel) for the UE. The D-SR channel may transmit 1-bit information at uniform time intervals.

In more detail, in the LTE system, in order to effectively use radio resources, the base station should know which and how many data each user wants to transmit. In case of downlink data, the downlink data is transferred from an access gateway to the base station. Thus, the base station knows how many data should be transferred to each user through downlink. Meanwhile, in case of uplink data, if the UE does not directly provide the base station with information about data the UE wants to transmit to uplink, the base station cannot know how many uplink radio resources are required by each UE. Thus, in order for the base station to appropriately allocate uplink radio resources to the UEs, each UE should provide information required for the base station to schedule radio resources to the base station.

To this end, when the UE has data to be transmitted, it provides corresponding information to the base station, and the base station transfers a resource allocation message to the UE based on the received information.

In this process, namely, when the UE informs the base station that it has data to be transmitted, the UE informs the base station about the amount of data accumulated in its buffer. It is called a buffer status report (BSR).

The BSR is generated in the format of a MAC control element, included in a MAC PDU, and transmitted from the UE to the base station. Namely, uplink radio resources are required for the BSR transmission, which means that uplink radio resource allocation request information for BSR transmission should be sent. If there is allocated uplink radio resource when the BSR is generated, the UE would transmit the BSR by using the uplink radio resource. The procedure of sending the BSR by the UE to the base station is called a BSR procedure. The BSR procedure starts 1) when every buffer does not have data and data is newly arrived to a buffer, 2) when data is arrived to a certain empty buffer and a priority level of a logical channel related to the buffer is higher than a logical channel related to the buffer previously having data, and 3) when a cell is changed. In this respect, with the BSR procedure triggered, when uplink radio resources are allocated, if transmission of all the data of the buffer is possible via the radio resources but the radio resources are not sufficient to additionally include the BSR, the UE cancels the triggered BSR procedure.

However, if there is no allocated uplink radio resource when the BSR is generated, the UE performs a scheduling request (SR) procedure (i.e., resource allocation request procedure).

The SR procedure includes two methods: one is using a D-SR (Dedicated Scheduling Request) channel set for a PUCCH, and the other is using a RACH process. Namely, when the SR procedure is triggered and the D-SR channel has been allocated, the UE sends a radio resource allocation request by using the D-SR channel, whereas if the D-SR channel has not been allocated, the UE starts the RACH procedure. In case of using the D-SR channel, the UE transmits a radio request allocation signal on uplink via the D-SR channel.

The SR procedure may be continuously performed until the UE is allocated UL-SCH resources.

In general, with respect to the semi-persistent scheduling, the UE may send any logical channel or any control information by using the radio resources. The radio resources allocated according to the semi-persistent scheduling do not exist at every sub-frame. That is, considering that, in general, voice data is generated at 20 ms intervals, the radio resources are allocated substantially at 20 ms. When a call is established, the base station establishes various types of RBs with the UE. Namely, an RB for exchanging control signaling and an RB for Internet browsing, as well as an RB used for transmission of voice service data, may be set for the UE.

The characteristics of the services set for the RBs and the like are that data for the services are irregularly generated. Data of the voice service is regularly generated at 20 ms intervals, so the time point of generating the data of the voice service and a timing of radio resources allocated according to the semi-persistent scheduling can be adjusted to be consistent. However, a data generation time point of the other RBs are not mostly consistent with the timing of the radio resources allocated according to the semi-persistent scheduling. In this case, the BSR is generated, triggering the SR procedure. The SR procedure takes much time, and if radio resources are allocated according to the semi-persistent scheduling before radio resources are allocated through the SR procedure, the radio resources are wasted.

DISCLOSURE OF THE INVENTION

Therefore, an object of the present invention is to effectively transmit a radio resource allocation request when a base station and a user equipment (UE) exchange data.

To achieve these and other advantages and in accordance with the purpose of the present invention, as embodied and broadly described herein, there is provided a method of transmitting a radio allocated resource request to a network in a wireless communication system, including: determining whether or not at least one scheduling information has been triggered; checking if there are any periodically configured resources when the at least one scheduling information is determined to have been triggered; and performing a scheduling request (SR) procedure if the periodically configured resources are not available.

To achieve these and other advantages and in accordance with the purpose of the present invention, as embodied and broadly described herein, there is also provided a method of transmitting a radio allocated resource request to a network in a wireless communication system, the method comprising: determining whether at least one scheduling information has been triggered; checking if there are any allocated resources within a certain time period when the at least one scheduling information is determined to be triggered; and performing a scheduling request (SR) procedure if the allocated resources are not available within the certain time period.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

MODES FOR CARRYING OUT THE PREFERRED EMBODIMENTS

One aspect of this disclosure relates to the recognition by the present inventors about the problems of the related art as described above, and further explained hereafter. Based upon this recognition, the features of this disclosure have been developed.

Although this disclosure is shown to be implemented in a mobile communication system, such as a UMTS developed under 3GPP specifications, this disclosure may also be applied to other communication systems operating in conformity with different standards and specifications.

Hereinafter, description of structures and operations of the preferred embodiments according to the present invention will be given with reference to the accompanying drawings.

First, the present invention provides a method for effectively using radio resources by preventing a user equipment (UE), which has been allocated radio resources according to semi-persistent scheduling (i.e., a continuous radio resource allocation method), is prevented from unnecessarily reporting about buffer status information or performing a scheduling request (SR) procedure.

To this end, in the present invention, if radio resources allocated according to semi-persistent scheduling have been set, although a buffer status report (BSR) is triggered, the UE does not start the SR procedure automatically or arbitrarily. In this case, the triggered BSR may be canceled, or may be transmitted next time when uplink radio resources are allocated via a physical downlink control channel (PDCCH), may be transmitted via next uplink radio resources allocated according to semi-persistent scheduling, or may be transmitted by selectively using a temporally faster one of next uplink radio resources allocated according to the semi-persistent scheduling and uplink radio resources allocated via the PDCCH In the present invention, if radio resources allocated according to semi-persistent scheduling have been set, the UE does not trigger the BSR procedure. Namely, in general, when the BSR procedure is triggered, the SR procedure is also triggered, and in the present invention, not triggering the BSR procedure may be implemented such that although the BSR procedure is triggered, the SR procedure is not triggered.

In other words, if data arrives via a certain logical channel, the UE checks whether there are uplink radio resources which have been allocated to the UE itself according to the semi-persistent scheduling. The UE checks whether or not conditions of the BSR triggering are met only when there no radio resources, and if the conditions are met, the UE may trigger the BSR. If there is no radio resource allocated to uplink and the BSR procedure has been triggered, the UE checks whether there are uplink radio resources allocated to the UE itself according to the semi-persistent scheduling, and only when there is no radio resource, the UE may start the SR procedure. Here, when the semi-persistent scheduling is in use, although data arrives at an empty buffer, the BSR is not triggered. Or, although the BSR is triggered, the SR procedure is not triggered.

When the semi-persistent scheduling is in use, the base station additionally informs the UE about a BSR-related logical channel list. Here, when data arrives at the empty buffer of the UE, the UE checks whether or not the data is included in the BSR-related logical channel list. If the data is not included, the UE may trigger the BSR and start the SR if necessary. Or, when the semi-persistent scheduling is in use, the base station additionally informs the UE about the BSR-related logical channel list. Here, when data arrives at the empty buffer of the UE, the UE checks whether or not the data is included in the BSR-related logical channel list. If the data is included, the UE may trigger the BSR and start the SR if necessary.

When the semi-persistent scheduling is in use, the base station additionally informs the UE about a BSR-related logical channel list. Here, when data arrives at the empty buffer of the UE, the UE checks whether or not the data is included in the BSR-related logical channel list. If the data is not included, the UE may not trigger the BSR. Or, when the semi-persistent scheduling is in use, the base station additionally informs the UE about the BSR-related logical channel list. Here, when data arrives at the empty buffer of the UE, the UE checks whether or not the data is included in the BSR-related logical channel list. If the data is included, the UE may not trigger the BSR.

In the procedure, if data arrives at an empty buffer and a logical channel corresponding to the data has a higher priority level than those of other logical channels previously having data in the buffer, the UE may perform the above-described operations. In addition, when the semi-persistent scheduling is in use, the base station additionally informs the UE about the BSR-related logical channel list. Here, when data arrives at an empty buffer of the UE, the UE checks whether or not the data has a higher priority level than those of logical channel included in the BSR-related logical channel list, and if the data has a higher priority level, the UE may trigger the BSR.

In the procedure, when the BSR is triggered, if there is no allocated radio resource, the SR may be additionally triggered. Or, when the semi-persistent scheduling is in use, if the amount of data stored in a buffer of a certain logical channel is more than a certain level, the UE may trigger the BSR. Or, if the amount of data stored in the buffer of the certain logical channel is more than that of data that may be transmitted via radio resources allocated according to the semi-persistent scheduling, the UE may trigger the BSR.

As a different method, in the present invention, an operation method in consideration of a timer or time may be used. Namely, when the BSR is triggered at a certain time point and the semi-persistent scheduling has been set, a time difference between a time point of the triggered BSR and a next time point of the radio resources allocated according to the semi-persistent scheduling is calculated. If the time difference is within a certain range, the SR procedure is not started, whereas if the time difference is out of the certain range, the SR procedure is started. Or, when data arrives at an empty buffer with respect to a certain logical channel at a certain time point and the semi-persistent scheduling has been set, a time difference between the time point at which the data has arrived and a next time point of the radio resources allocated according to the semi-persistent scheduling are calculated. If the time difference is within a certain range, the BSR is not triggered, whereas if the time difference is out of the certain range, the BSR is triggered.

Figure 6:
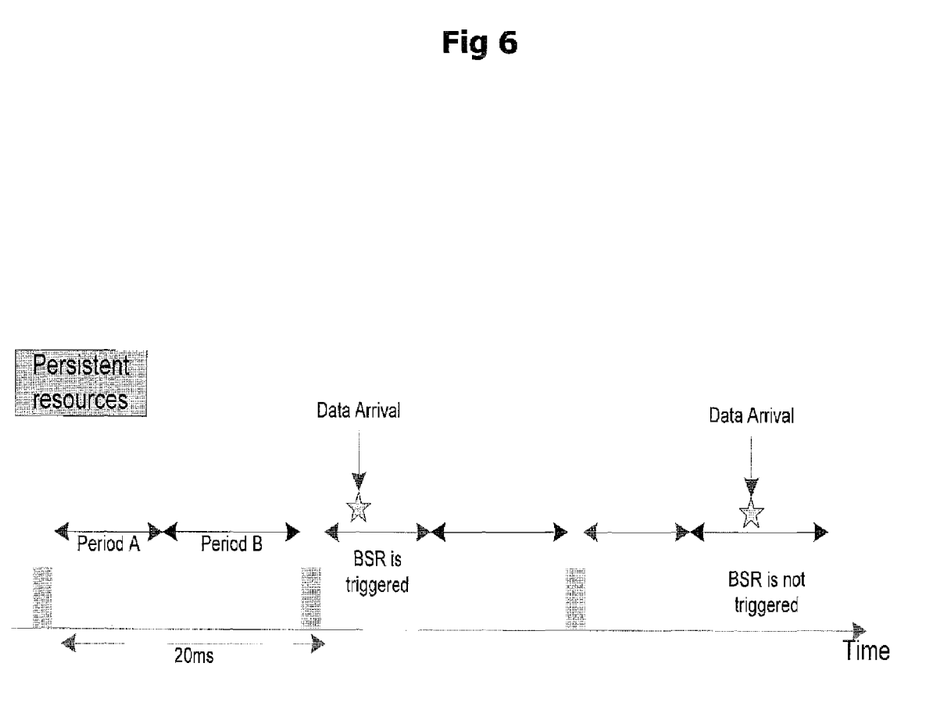
FIG. 6 illustrates a buffer status report (BSR) operation method using previously allocated radio resources according to an embodiment of the present invention.

FIG. 6 illustrates the buffer status report (BSR) operation method using previously allocated radio resources according to an embodiment of the present invention.

With reference to FIG. 6, the BSR may be also equally interpreted as the SR. As shown in FIG. 6, it is assumed that an interval from a time point at which radio resources are allocated according to the semi-persistent scheduling to a certain time point is arbitrarily called a 'period B', and the other time interval is called 'period A'. Here, if data arrives at the period A, the SR or the BSR procedure starts in the same manner as described above, and if data arrives at the period B, the SR or the BSR procedure does not start in the same manner as described above.

In the present invention, the case where radio resources are allocated according to the semi-persistent scheduling is has been described. However, the present invention may be used or applied for general dynamic radio resource allocation methods. For example, in the actual dynamic radio resource allocation method, there is a time difference between a time point at which a radio resource allocation message is transmitted via the PDCCH and a time point at which radio resources indicated by the radio resource allocation message are used by the UE. Thus, performing the SR or the BSR when data arrives during the period of the time difference is wasteful. Therefore, in the present invention, the BSR or the SR is not triggered or disregarded until when the radio resources are actually used. Also, in the present invention, if data newly arrives at a buffer of a certain particular logical channel, in particular, when a priority level of the logical channel is higher than those of any other logical channels previously having data, and if all the new data arriving at the logical channel can be transmitted via newly allocated UL-SCH radio resources, the BSR procedure is canceled or not started As so far described, the present invention proposes a method for preventing starting of SR or BSR when the UE already has radio resources which have been allocated from the base station, whereby the base station would not allocate radio resources any more than necessary, thus preventing a waste of radio resources.

The present disclosure may provide a method of transmitting a radio allocated resource request to a network in a wireless communication system, the method comprising: determining whether or not at least one scheduling information has been triggered; checking if there are any periodically configured resources when the at least one scheduling information is determined to have been triggered; and performing a scheduling request (SR) procedure if the periodically configured resources are not available, wherein the at least one scheduling information is a Buffer Status Report (BSR), the periodically configured resources are persistent resources (PRs), the scheduling request procedure is performed by either an uplink control channel transmission or a RACH (Random Access Channel) procedure, the scheduling request is signalled on the uplink control channel if the uplink control channel is configured to send the scheduling request and the RACH (Random Access Channel) procedure is initiated if the uplink control channel is not configured to send the scheduling request, and the uplink control channel is PUCCH (Physical Uplink Control Channel).

It can be also said that the present disclosure may provide a method of transmitting a radio allocated resource request to a network in a wireless communication system, the method comprising: determining whether at least one scheduling information has been triggered; checking if there are any allocated resources within a certain time period when the at least one scheduling information is determined to be triggered; and performing a scheduling request (SR) procedure if the allocated resources are not available within the certain time period, wherein the at least one scheduling information is a Buffer Status Report (BSR), the allocated resources are periodically configured resources, the scheduling request procedure is performed by either an uplink control channel transmission or a RACH (Random Access Channel) procedure, the scheduling request is signalled on the uplink control channel if the uplink control channel is configured to send the scheduling request and the RACH (Random Access Channel) procedure is initiated if the uplink control channel is not configured to send the scheduling request, the uplink control channel is PUCCH (Physical Uplink Control Channel), the certain time period is configured by RRC (Radio Resource Control) layer, and the certain time period is set based on a round trip time of data transmission.

Although the present disclosure is described in the context of mobile communications, the present disclosure may also be used in any wireless communication systems using mobile devices, such as PDAs and laptop computers equipped with wireless communication capabilities (i.e. interface). Moreover, the use of certain terms to describe the present disclosure is not intended to limit the scope of the present disclosure to a certain type of wireless communication system. The present disclosure is also applicable to other wireless communication systems using different air interfaces and/or physical layers, for example, TDMA, CDMA, FDMA, WCDMA, OFDM, EV-DO, Wi-Max, Wi-Bro, etc.

The exemplary embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.).

Code in the computer readable medium may be accessed and executed by a processor. The code in which exemplary embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present disclosure, and that the article of manufacture may comprise any information bearing medium known in the art.

As the present disclosure may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

The invention claimed is:

1. A method of transmitting a radio allocated resource request to a network in a wireless communication system, the method performed by a device and comprising:
   determining whether or not a buffer status report (BSR) has been triggered;
   if the BSR has been triggered, then checking if there is a configured resource of the network that is available to the device;
   if the checking step determines that there is no configured resource of the network that is available to the device, then triggering a scheduling request (SR) to the network; and
   if the checking step determines that the configured resource of the network is available to the device, then generating a BSR media access control (MAC) control element and operating a timer related to the BSR.

2. The method of claim 1 wherein the SR is performed by either via an uplink control channel or via a RACH (Random Access Channel) procedure.

3. The method of claim 2,
   wherein the SR is signalled on the uplink control channel if the uplink control channel is configured to send the SR, and
   wherein the RACH procedure is initiated if the uplink control channel is not configured to send the SR.

4. The method of claim 3, wherein the uplink control channel is a PUCCH (Physical Uplink Control Channel).

5. The method of claim 1, further comprising:
   transmitting the BSR upon receiving a response to the triggering of the SR.

6. The method of claim 1, further comprising:
   transmitting the BSR in accordance with the BSR MAC control element.

7. The method of claim 6, further comprising:
   retransmitting the BSR it the timer expires before receiving a response to the transmitted BSR.

8. The method of claim 1, wherein the SR includes a request for the configured resource.

9. The method of claim 1, wherein the configured resource is a persistent resource (PR) of the network that is allocated to the device.

10. A device configured to transmit a radio allocated resource request to a network in a wireless communication system, the device comprising:
    a processor configured to
      determine whether or not a buffer status report (BSR) has been triggered,
      if the BSR has been triggered, then check if there is a configured resource of the network that is available to the device,
      if the processor determines that there is no configured resource of the network that is available to the device, then trigger a scheduling request (SR) with the network, and
      if the processor determines that the configured resource of the network is available to the device, them generate a BSR media access control (MAC) control element and operate a timer related to the BSR.

11. The device of claim 10, wherein the SR is performed by either an uplink control channel transmission or a RACH (Random Access Channel) procedure.

12. The device of claim 11,
    wherein the SR is signalled on the uplink control channel if the uplink control channel is configured to send the SR, and
    wherein the RACH procedure is initiated if the uplink control channel is not configured to send the SR.

13. The device of claim 12, wherein the uplink control channel is a PUCCH (Physical Uplink Control Channel).

14. The device of claim 10, wherein the processor is further configured to transmit the BSR upon receiving a response to the triggering of the SR.

15. The device of claim 10, wherein the processor is further configured to transmit the BSR in accordance with the BSR MAC control element.

16. The device of claim 15, wherein the processor is further configured to retransmit the BSR if the timer expires before receiving a response to the transmitted BSR.

17. The device of claim 10, wherein the SR includes a request for the configured resource.

18. The device of claim 10, wherein the configured resource is a persistent resource (PR) of the network that is allocated to the device.

19. The method of claim 1, wherein the triggered BSR is different from the triggered SR.

20. The device of claim 10, wherein the triggered BSR is different from the triggered SR.

* * * * *